(12) United States Patent
Schick

(10) Patent No.: US 9,982,767 B2
(45) Date of Patent: May 29, 2018

(54) FOLLOWER MECHANISM

(75) Inventor: Gary Schick, Easley, SC (US)

(73) Assignee: Koyo Bearings North America LLC, Westlake, OH (US)

(*) Notice: Subject to any disclaimer, the term of this patent is extended or adjusted under 35 U.S.C. 154(b) by 184 days.

(21) Appl. No.: 14/377,471

(22) PCT Filed: Feb. 8, 2012

(86) PCT No.: PCT/US2012/024225
§ 371 (c)(1),
(2), (4) Date: Dec. 3, 2014

(87) PCT Pub. No.: WO2013/119214
PCT Pub. Date: Aug. 15, 2013

(65) Prior Publication Data
US 2015/0082938 A1   Mar. 26, 2015

(51) Int. Cl.
*F16H 53/06* (2006.01)
*F01L 1/12* (2006.01)
*F01L 1/14* (2006.01)

(52) U.S. Cl.
CPC ............... *F16H 53/06* (2013.01); *F01L 1/12* (2013.01); *F01L 1/14* (2013.01); *F01L 1/143* (2013.01); *F01L 2101/00* (2013.01); *F01L 2105/00* (2013.01); *F01L 2105/02* (2013.01); *F01L 2107/00* (2013.01); *Y10T 74/2107* (2015.01)

(58) Field of Classification Search
CPC ..... F16H 53/05; F01L 1/12; F01L 1/14; F01L 1/143; F01L 2105/02; F01L 2107/00; Y10T 74/2107
See application file for complete search history.

(56) References Cited

U.S. PATENT DOCUMENTS 5,273,005 A * 12/1993 Philo .................. F01L 1/14
                                                      123/90.5
8,235,018 B2   8/2012 Dorn et al.
(Continued)

FOREIGN PATENT DOCUMENTS

DE   102004002487 A1   8/2005
DE   102008031752 A1   1/2010
(Continued)

OTHER PUBLICATIONS

Office Action dated Jan. 14, 2016, for Japanese Patent Application No. 2014-556521.
(Continued)

*Primary Examiner* — Richard W Ridley
*Assistant Examiner* — Brian J McGovern
(74) *Attorney, Agent, or Firm* — Nelson Mullins Riley & Scarborough LLP

(57) ABSTRACT

A follower mechanism movable along an axis within a bore including an alignment groove. The follower mechanism includes a bucket with a cylindrical inner surface and a cylindrical outer surface, and a yoke positioned at least partially within the bucket, the yoke including a bottom wall and two opposed sidewalls depending upwardly therefrom, each sidewall defining a shaft aperture. A shaft with first and second ends is received in the shaft apertures, and a roller follower is rotatably received on the shaft such that a portion of the roller follower extends axially outwardly beyond the bucket.

15 Claims, 8 Drawing Sheets

(56) References Cited

U.S. PATENT DOCUMENTS

| | | | |
|---|---|---|---|
| 2008/0190237 A1 | 8/2008 | Radiner et al. | |
| 2010/0229812 A1 | 9/2010 | Dorn et al. | |
| 2012/0234277 A1* | 9/2012 | Dorn ...................... | F01L 1/146 |
| | | | 123/90.48 |
| 2013/0068064 A1 | 3/2013 | Geyer et al. | |

FOREIGN PATENT DOCUMENTS

| | | |
|---|---|---|
| DE | 102009013132 A1 | 9/2010 |
| DE | 102010022318 A1 | 12/2011 |
| DE | 102010026362 A1 | 1/2012 |

OTHER PUBLICATIONS

Office Action dated Feb. 19, 2016, for Chinese Patent Application No. 201280071481.4.

Office Action dated May 29, 2015 for Korean Patent Application No. 10-2014-7024355.

International Search Report and the Written Opinion for PCT/US2012/024225 dated Oct. 31, 2012.

* cited by examiner

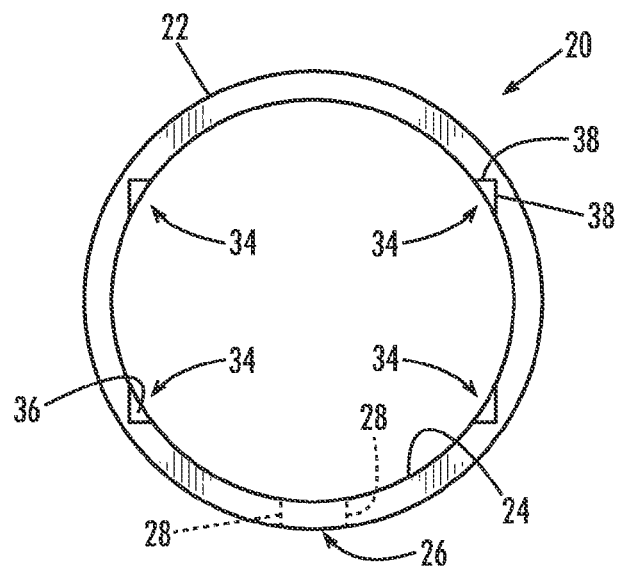
Fig. 4
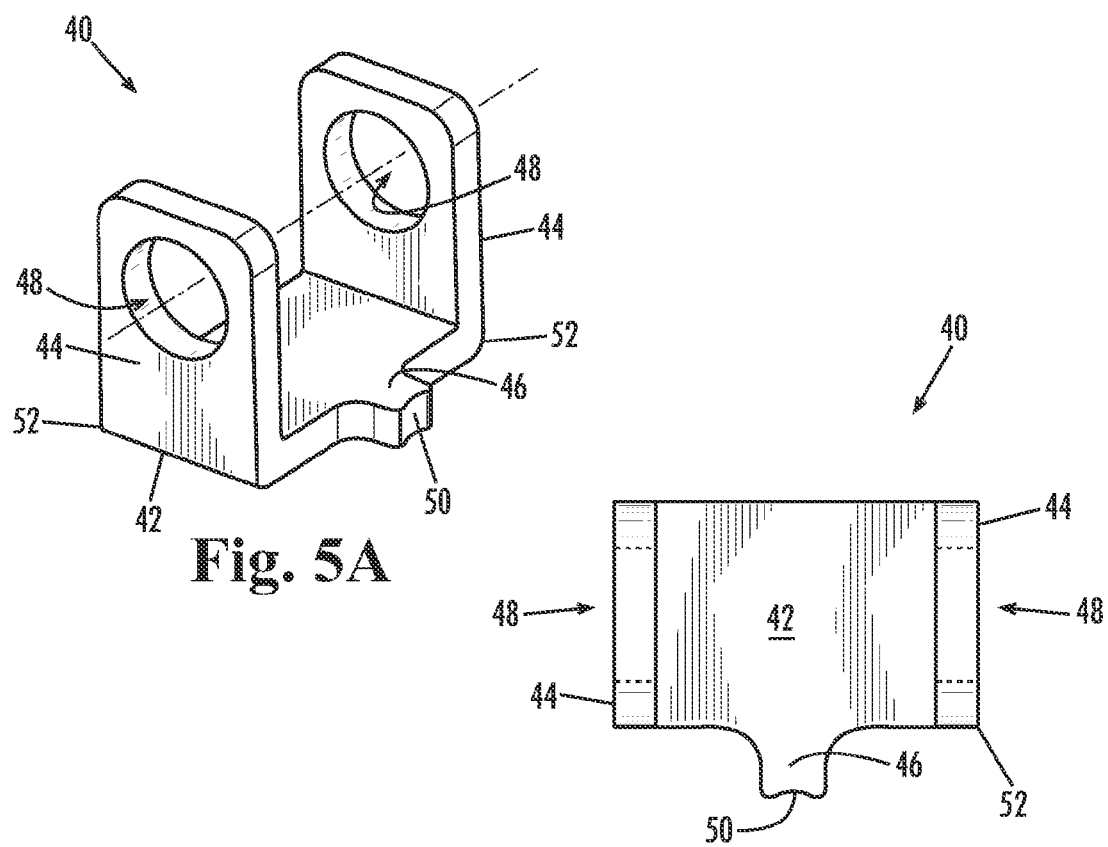
Fig. 5A
Fig. 5B

FOLLOWER MECHANISM

FIELD OF THE INVENTION

The present invention relates generally to follower mechanisms. More particularly, the present invention relates to designs and assembly methods of follower mechanisms and their associated alignment devices.

BACKGROUND OF THE INVENTION

Follower mechanisms are often used in a valve train of an internal combustion engine to transmit motion from a camshaft of the engine to one or more intake or exhaust valves. As the camshaft rotates, the follower mechanisms receive both a sideways force and a downward force from corresponding lobes on the camshaft, but only transmit the downward force to the valves to open and/or close the valves. Follower mechanisms thereby reduce the possibility of bending or otherwise damaging the valve stems of the valves. As well, follower mechanisms are often used in camshaft driven, high-pressure fuel pumps which are used in gasoline direct injection systems.

Existing bucket-type follower mechanisms typically include either a stamped or cold formed bucket. A roller follower is typically supported on a shaft that is directly fixed to the bucket such as by staking, swaging, etc. As such, the bucket is a load bearing member and, therefore, requires heat treatment and operations such as grinding. As well, follower mechanisms often have some form of alignment device carried in an aperture defined by the bucket such that rotation of the follower mechanism within its corresponding bore is prevented. One example of known alignment devices includes a mushroom-shaped pin that is fixed in an aperture of the follower mechanism's bucket. Such pins can be difficult to manufacture because of their complicated shapes. As well, required heat treatments of the bucket can cause distortion of the aperture which receives the alignment device, thereby complicating assembly. Such alignment devices are often fixed in their corresponding apertures by an interference fit.

The present invention recognizes and addresses considerations of prior art constructions and methods.

SUMMARY OF THE INVENTION

One embodiment of the present disclosure provides a follower mechanism movable along an axis within a bore including an alignment groove. The follower mechanism includes a bucket with a cylindrical inner surface and a cylindrical outer surface, and a yoke positioned at least partially within the bucket, the yoke including a bottom wall and two opposed sidewalls depending upwardly therefrom, each sidewall defining a shaft aperture. A shaft with first and second ends is received in the shaft apertures, and a roller follower is rotatably received on the shaft such that a portion of the roller follower extends axially outwardly beyond the bucket.

Another embodiment of the present disclosure provides a follower mechanism movable along an axis within a bore including an alignment groove. The follower mechanism includes a bucket with a cylindrical inner surface and a cylindrical outer surface, and defining an aperture, the aperture having a length parallel to the axis and a width transverse to the axis. An alignment device is positioned at least partially within the aperture, the alignment device having a length parallel to the axis and a width transverse to the axis, wherein a maximum length of the aperture is greater than a maximum length of the alignment device and a maximum width of the aperture is greater than a maximum width of the alignment device.

Another embodiment of the present disclosure provides a follower mechanism movable along an axis within a bore including an alignment groove. The follower mechanism includes a bucket with a cylindrical inner surface and a cylindrical outer surface, and defining an aperture, the aperture having a length parallel to the axis and a width transverse to the axis. An alignment device is positioned at least partially within the aperture, the alignment device having a length parallel to the axis and a width transverse to the axis. The alignment device has a generally rectangular cross-sectional shape when taken through a plane in which both a longitudinal center axis of the alignment device and the axis of the bore lie.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which;

FIG. 4 is a top view of a bucket of the follower mechanism shown in FIG. 1;

FIGS. 5A and 5B are perspective and top views, respectively, of a yoke of the follower mechanism shown in FIG. 1;

Figure 1:
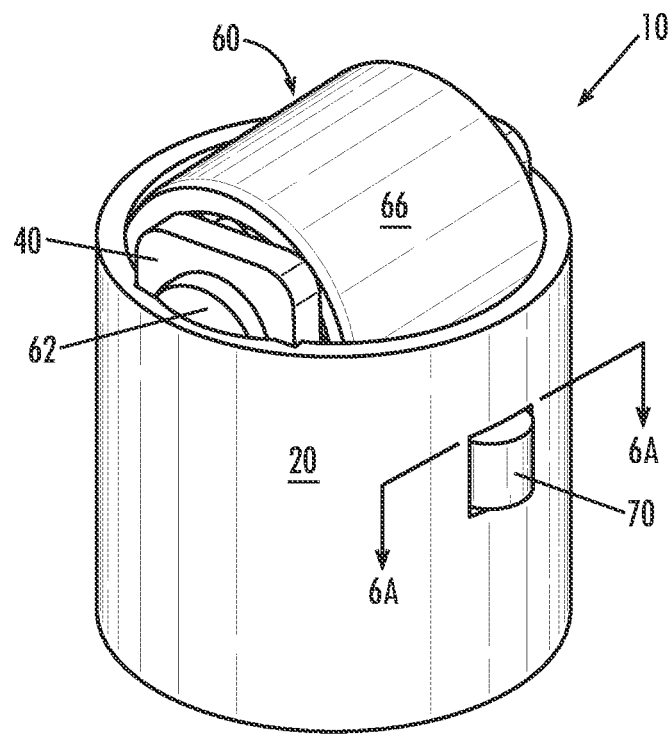
FIG. 1 is a perspective view of an embodiment of a follower mechanism including an alignment device in accordance with the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
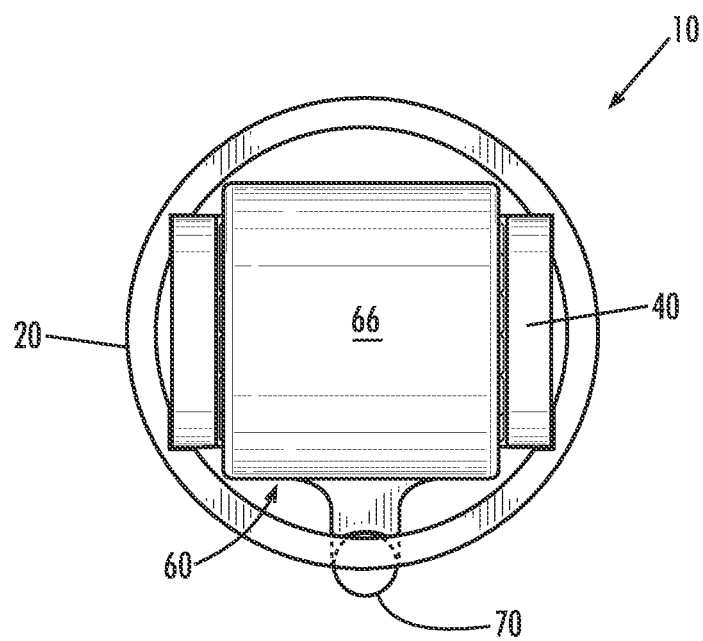
FIG. 2 is a top view of the follower mechanism shown in FIG. 1.
Figure 3:
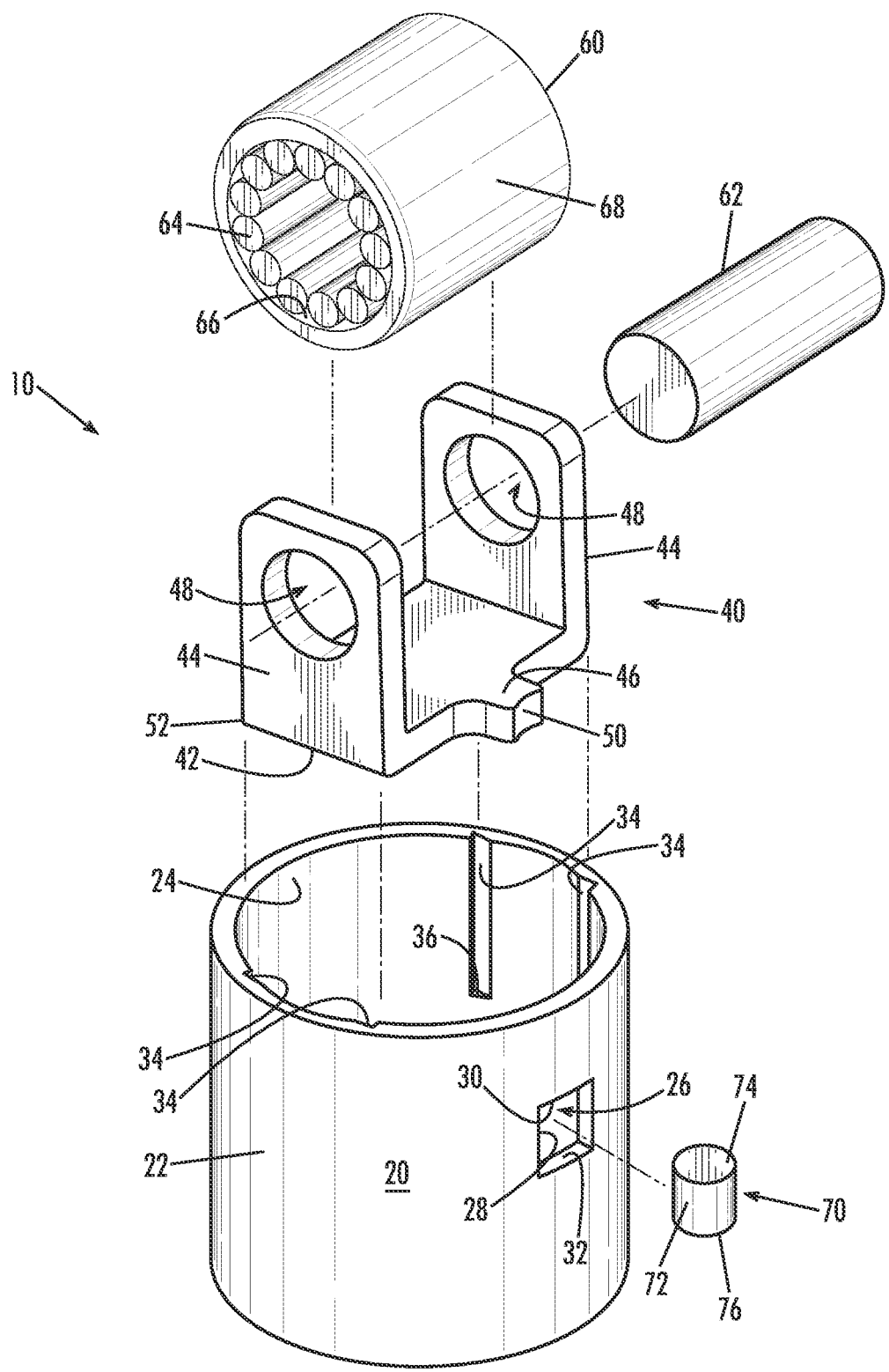
FIG. 3 is an exploded perspective view of the follower mechanism shown in FIG. 1.
Figure 13:
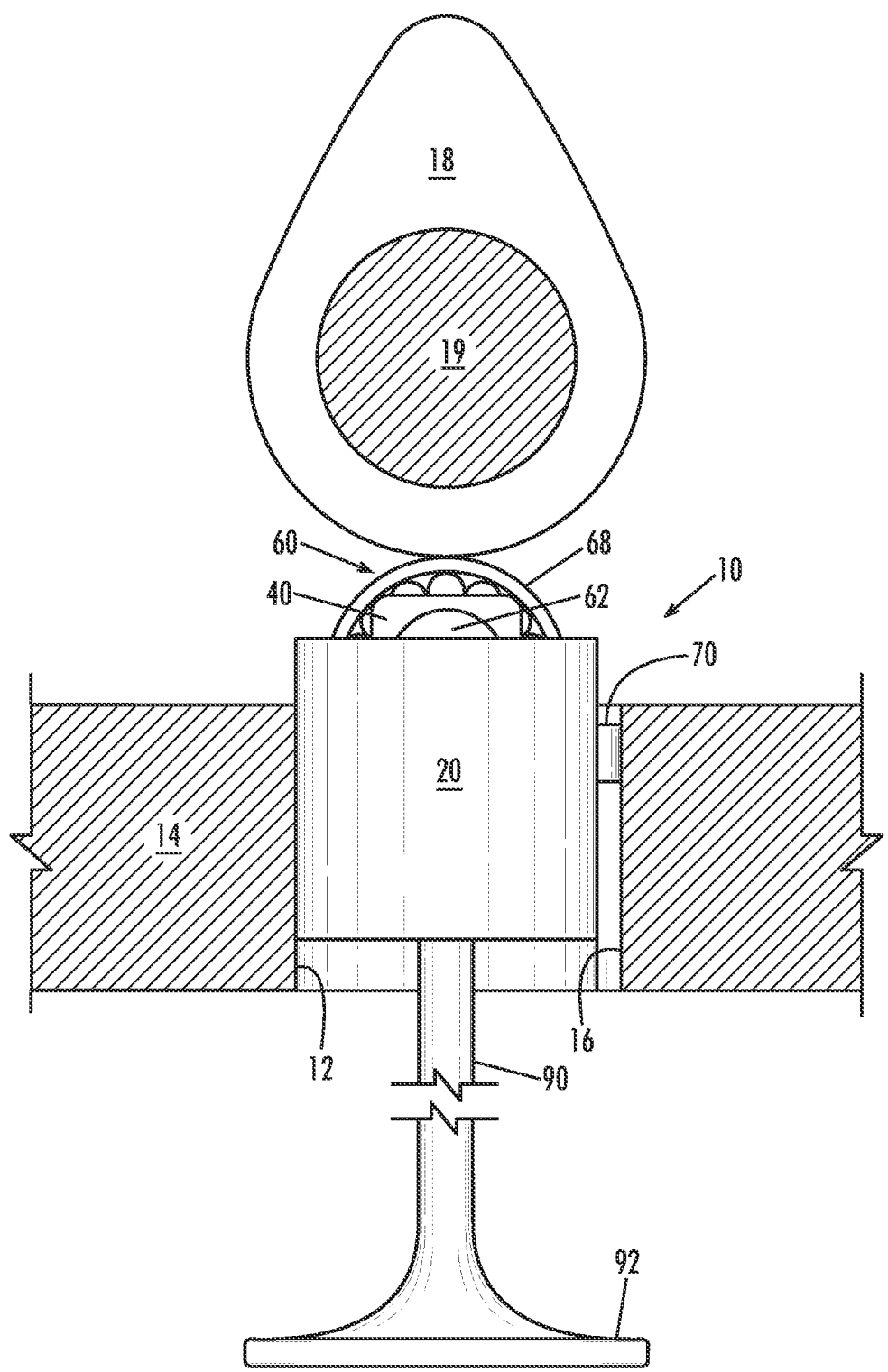
FIG. 13 is a partial cross-sectional view of the follower mechanism and alignment device shown in FIG. 1 assembled in a cylinder head.

Referring now to the figures, as shown in FIGS. 1 through 3, an embodiment of a follower mechanism 10 in accordance with the present disclosure includes a substantially cylindrical bucket 20, a yoke 40 received therein, a roller follower 60 supported by yoke 40, and an alignment device 70 received in an aperture 26 of bucket 20. As shown in FIG. 13, follower mechanism 10 is configured for use in a valve train of an internal combustion engine to facilitate opening and closing an intake valve or an exhaust valve of the valve train. As a camshaft 19 of the engine rotates, a lobe 18 of camshaft 19, or a rocker arm (not shown) connected to camshaft 19, engages roller follower 60 of follower mechanism 10 to convert the rotational motion of camshaft 19 into linear motion of follower mechanism 10 within a bore 12 of a corresponding cylinder head 14. A valve stem 90 of valve 92 is positioned within and connected to follower mechanism 10 such that, as follower mechanism 10 moves in a linear direction within bore 14, valve 92 is alternatingly opened and closed. Forces from camshaft 19 are thereby transmitted through follower mechanism 10 to valve 92 such that only forces in substantially the same direction as the motion of valve 92 act on valve 92. In addition, follower mechanism 10 serves as a torsional vibration isolation device between camshaft 19 and valve 92 to inhibit rotational forces from being transmitted to valve 92. As shown, alignment device 70 is a substantially cylindrical rod, a portion of which is slidably received in a correspondingly shaped alignment groove 16 defined by the inner wall of bore 12.

Referring additionally to FIG. 4, bucket 20 of the present embodiment includes a cylindrical outer surface 22, a cylindrical inner surface 24 substantially concentric therewith, and aperture 26 defined therein for receiving alignment device 70. As shown, aperture 26 is generally rectangular and is formed by a pair of opposed sidewalls 28, a top wall 30, and a bottom wall 32. Opposed side walls 28 are substantially parallel to each other, as are top wall 30 and bottom wall 32, which in addition, are substantially transverse to opposed side walls 28. As discussed in greater detail below, although aperture 26 is greater in height than alignment device 70 to facilitate insertion, aperture 26 is more narrow in width than alignment device 70 such that alignment device 70 is received in aperture 26 by a press-fit. In an alternate embodiment, the aperture is generally larger, both wider and higher, than alignment device 70 to provide clearance for alignment device 70 during assembly. Bucket 20 can be formed by a stamping process, in which case aperture is formed by, for example, piercing, machining, or otherwise cutting into bucket 20. Alternately, bucket 20 can be formed by a powdered metal process.

Bucket 20 also includes a plurality of axially extending grooves 34 defined by inner surface 24. Each axially extending groove 34 extends downwardly from a top edge of bucket 20 and terminates at a corresponding stop face 36 such that axially extending grooves 34 extend along only a portion of the height of bucket 20. Each axially extending groove 34 is configured to slidably receive a corresponding corner 52 of a bottom wall 42 of yoke 40 such that yoke 40 is slidably received within bucket 20. Axially extending grooves 34 can be formed by a broaching process where bucket 20 is formed by stamping, or may be formed by a process using powdered metal.

Referring additionally to FIGS. 5A and 5B, yoke 40 includes bottom wall 42, a pair of opposed sidewalls 44 extending upwardly therefrom, a pair of shaft apertures 48 defined by sidewalls 44, and a projection 46 extending outwardly from a peripheral edge of bottom wall 42. As shown, bottom wall 42 is substantially rectangular with sidewalls 44 extending upwardly from a pair of its opposed edges. Each corner 52 of bottom wall 42 is slidably received in a corresponding axially extending groove 34 of bucket 20 until corners 52 of bottom wall 42 abut corresponding stop faces 36. As shown in FIGS. 1 and 13, when fully inserted in bucket 20, the uppermost ends of the yoke's sidewalls 44 extend axially outwardly beyond the top edge of bucket 20. Additionally, once fully inserted in bucket 20, yoke 40 is retained therein by staking, swaging, welding, etc. Preferably, yoke 40 is formed by a stamping process and is subjected to heat treatment processes as well. Projection 46 includes an abutment surface 50 at its distal end that is correspondingly shaped to a portion of an outer surface 72 of alignment device 70. Axially extending grooves 34 of bucket 20 are configured such that when yoke 40 is fully inserted in bucket 20, abutment surface 50 of projection 46 is positioned radially inwardly of aperture 26 so that it may receive alignment device 70 (FIG. 6).

As best seen in FIG. 3, roller follower 60 includes shaft 62, an outer race 66, and a plurality of rollers 64 disposed therebetween such that race 66 is freely rotatable about shaft 62. Opposite ends of shaft 62 are received in shaft apertures 48 of yoke 40 such that roller follower 60 is mounted to bucket 20 of follower mechanism 10. When assembled, roller follower 60 extends axially outwardly beyond the top edge of bucket 20 such that outer surface 68 of race 66 engages a corresponding lobe 18 of camshaft 19, as shown in FIG. 12. Preferably, the diameters of shaft apertures 48 are slightly larger than the diameter of shaft 62 such that shaft 62 is free to precess within shaft apertures 48 during operation. Alternately, the opposing ends of shaft 62 can be staked, swaged, etc., to yoke 40 such that rotation relative thereto is prevented.

Figure 6A:
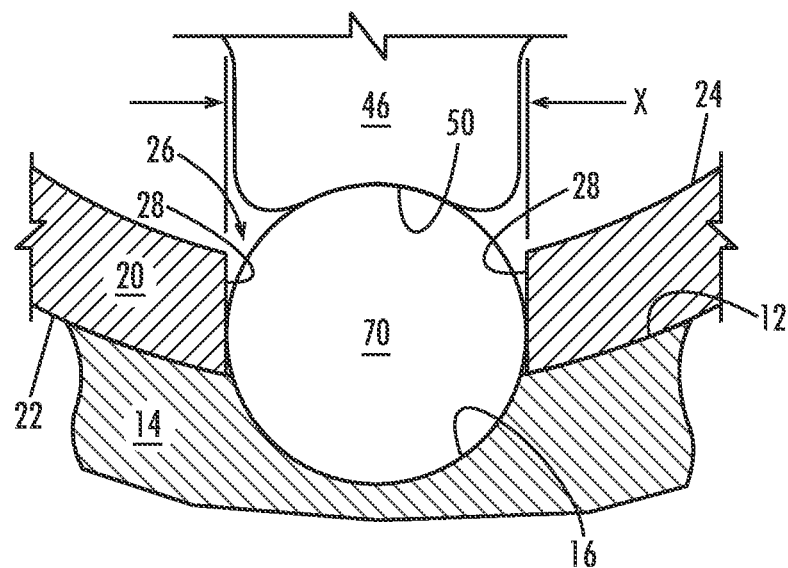
FIG. 6A is a partial cross-sectional view of the follower mechanism and alignment device, taken along line 6A-6A of FIG. 1.

As previously noted, alignment device 70 is a substantially cylindrical rod including cylindrical outer surface 72 and substantially parallel top and bottom surfaces 74 and 76, respectively. As best seen in FIG. 6A, a width X defined by sidewalls 28 of aperture 26 is slightly less than the diameter of cylindrical rod 70. Preferably, cylindrical rod 70 is positioned in aperture 26 from the outside of bucket 20 in a press fit subsequent to assembly of yoke 40 and roller follower 60 within bucket 20. As such, cylindrical rod 70 is retained in aperture 26 once assembled. The height defined by top wall 30 and bottom wall 32 of aperture 26 is greater than the height of cylindrical rod 70 as defined by top surface 74 and bottom surface 76 to facilitate insertion of cylindrical rod 70 into aperture 26. When fully assembled in bucket 20, abutment surface 50 of projection 46 supports cylindrical rod 70 such that a portion of cylindrical rod 70 extends radially outwardly beyond outer surface 22 of bucket 20, and is therefore slidably received in alignment groove 16 of bore 12.

Figure 6B:
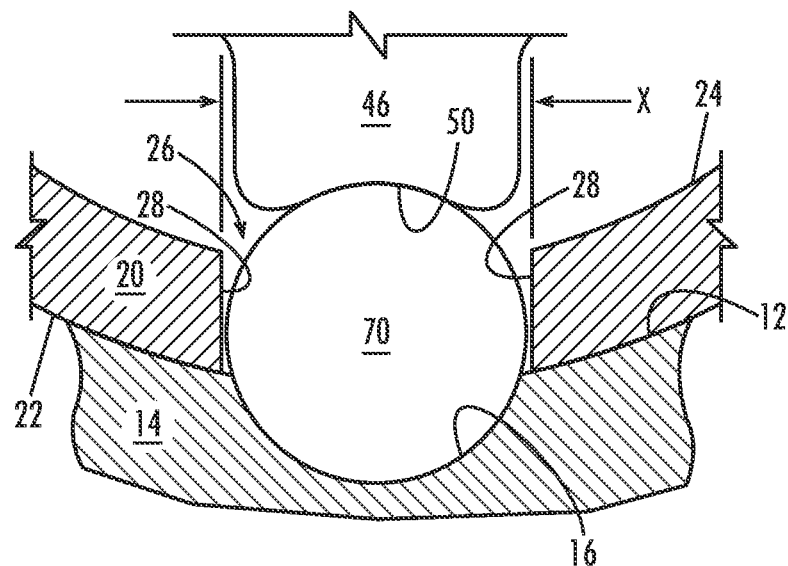
FIG. 6B is a partial cross-sectional view of an alternate embodiment of a follower mechanism in accordance with the present disclosure.

Referring now to FIG. 6B, an alternate embodiment of an alignment device in accordance with the present disclosure is shown. As best seen in FIG. 6B, a width X defined by sidewalls 28 of aperture 26 is greater than the diameter of cylindrical rod 70. Additionally, the height defined by top wall 30 and bottom wall 32 of aperture 26 is greater than the height of cylindrical rod 70 as defined by top surface 74 and bottom surface 76. As such, cylindrical rod 70 can be positioned in aperture 26 from the outside of bucket 20 subsequent to assembly of yoke 40 and roller follower 60 within bucket 20. When fully assembled in bucket 20, abutment surface 50 of projection 46 receives cylindrical rod 70 such that a portion of cylindrical rod 70 extends radially outwardly beyond outer surface 22 of bucket 20, and is therefore slidably received in alignment groove 16 of bore 12.

Figure 7:
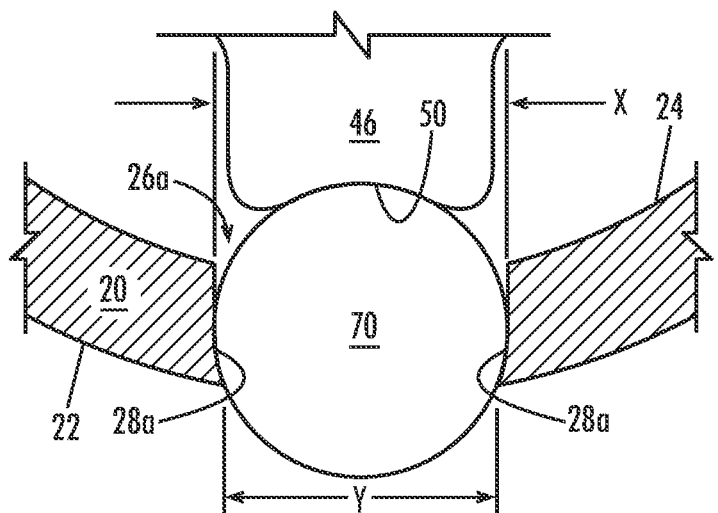
FIG. 7 is a partial cross-sectional view of an alternate embodiment of a follower mechanism in accordance with the present disclosure.

Referring now to FIG. 7, an alternate embodiment of an alignment device in accordance with the present disclosure is shown. The alignment device includes a cylindrical rod 70 as previously discussed. However, an aperture 26a defined in bucket 20 differs from the aperture of the previously discussed embodiment. More specifically, although the height of aperture 26a is slightly greater than the height of cylindrical rod 70, and a width X of aperture 26a at inner surface 24 is slightly greater than a diameter of cylindrical rod 70, a width Y of aperture 26a at outer surface 22 is less than the diameter of cylindrical rod 70. Therefore, cylindrical rod 70 cannot be inserted into aperture 26a from the outside of bucket 20. As such, cylindrical rod 70 is inserted in aperture 26a from the inside of bucket 20 prior to assembly of yoke 40 and roller follower 60 within bucket 20. Note, opposed sidewalls 28a of aperture 26a are not substantially parallel in that their outermost edges are closer together than their innermost edges. Note, for the embodiment shown in FIGS. 6A, 6B and 7, cylindrical rod 70 can be replaced with a round bearing if apertures 26 and 26a, respectively, are circular rather that rectangular.

Figure 8:
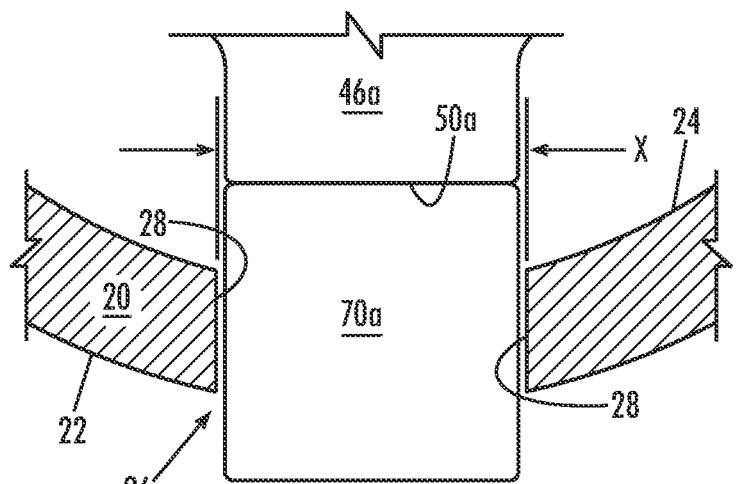
FIG. 8 is a partial cross-sectional view of an alternate embodiment of a follower mechanism in accordance with the present disclosure.

Referring now to FIG. 8, an alternate embodiment of an alignment device in accordance with the present disclosure is shown. The alignment device is substantially similar to the alignment device as shown in FIGS. 1 through 6, with only those elements that differ receiving alternate reference numerals. As shown, the alignment device is a rectangular rod that is received in aperture 26 defined by bucket 20. In that rectangular rod 70a includes four substantially planar sides defining its outer surface, abutment surface 50a of the yoke's projection 46a is formed by a planar surface for receiving rectangular rod 70a. As shown, the portion of rectangular rod 70a that extends outwardly beyond outer surface 22 of bucket 20 is substantially rectangular in shape. As such, the corresponding alignment groove (not shown) defined by bore 12 in which follower mechanism 10 is slidably received has a correspondingly-shaped cross section.

Figure 9:
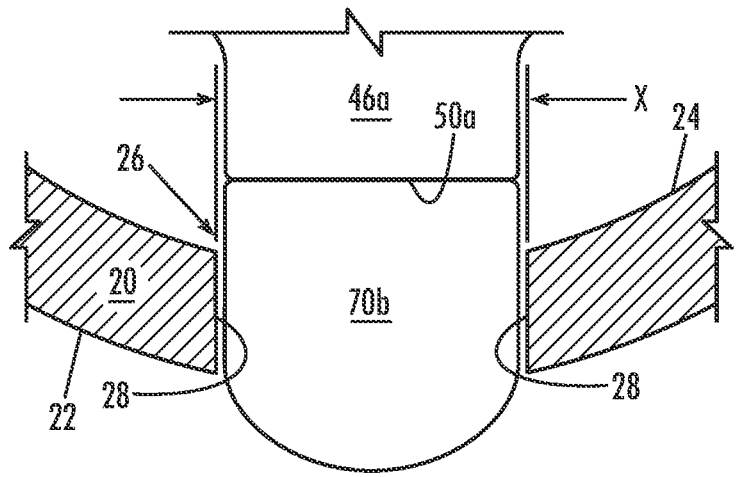
FIG. 9 is a partial cross-section view of an alternate embodiment of a follower mechanism in accordance with the present disclosure.

Referring now to FIG. 9, an alternate embodiment of an alignment device in accordance with the present disclosure is shown. The alignment device is substantially similar to the alignment device as shown in FIGS. 1 through 6, with only those elements that differ receiving alternate reference numerals. As shown, the alignment device includes a rectangular portion that is received in aperture 26 of bucket 20 and a curved portion that extends radially outward from outer surface 22 of bucket 20. In that rod 70b includes a substantially planar side defining its innermost surface, abutment surface 50a of the yoke's projection 46a is formed by a planar surface for receiving rod 70b. As noted, the portion of rod 70b that extends outwardly beyond outer surface 22 of bucket 20 is curved in shape. As such, the corresponding alignment groove 16 (FIG. 13) defined by bore 12 in which follower mechanism 10 is slidably received has a correspondingly-shaped cross section.

Figure 10A:
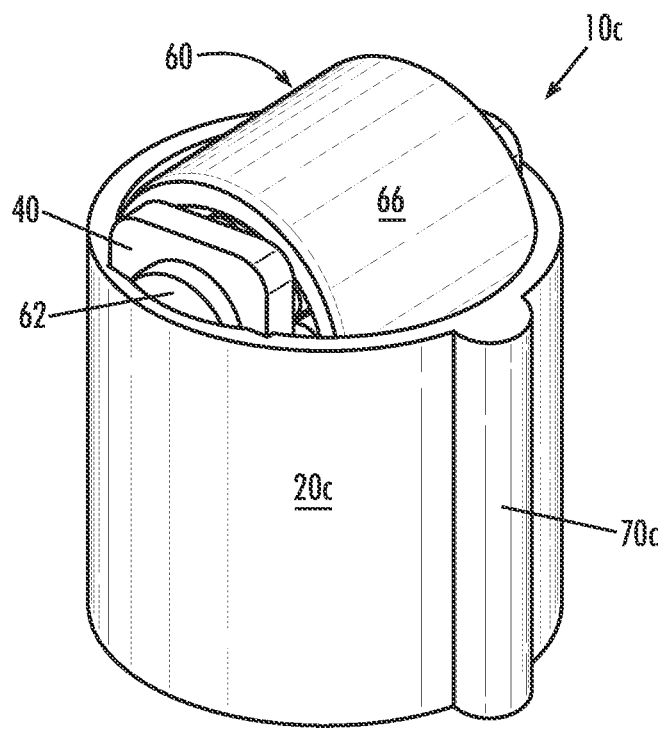
FIGS. 10A and 10B are a perspective and a top view, respectively, of an alternate embodiment of a follower mechanism and alignment device in accordance with the present disclosure.
Figure 10B:
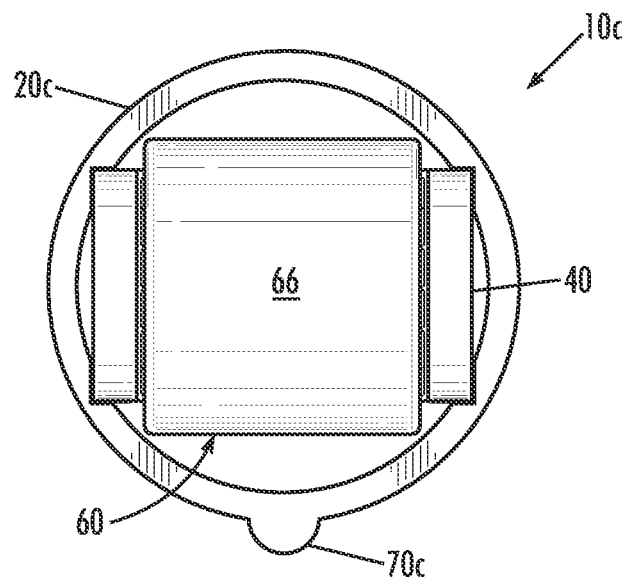

Referring now to FIGS. 10A and 10B, a follower mechanism 10c including an alternate embodiment of an alignment device in accordance with the present disclosure is shown. Follower mechanism 10c differs primarily from the first embodiment as discussed with regard to FIGS. 1 through 6 in that bucket 20c of follower mechanism 10c is formed by a process using powdered metal. By forming bucket 20c with powdered metal, the alignment device may be formed as an integral projection 70c of bucket 20c. As such, a separate alignment device is not required and there is no need to form an aperture for receiving an alignment device in bucket 20c. Additionally, yoke 40 is not required to have a projection 46 as in the previously discussed embodiments.

Figure 11A:
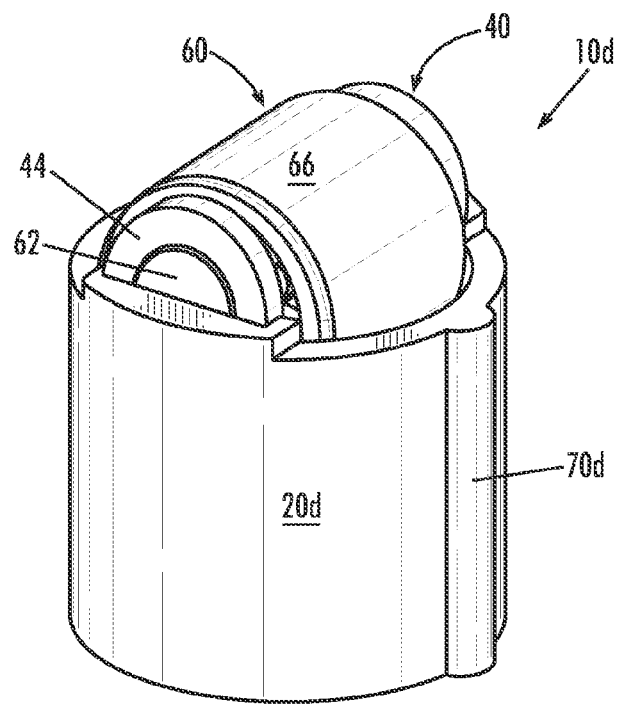
FIGS. 11A and 11B are a perspective view and a top view, respectively, of an alternate embodiment of a follower mechanism and alignment device in accordance with the present disclosure.
Figures 11B, 12:
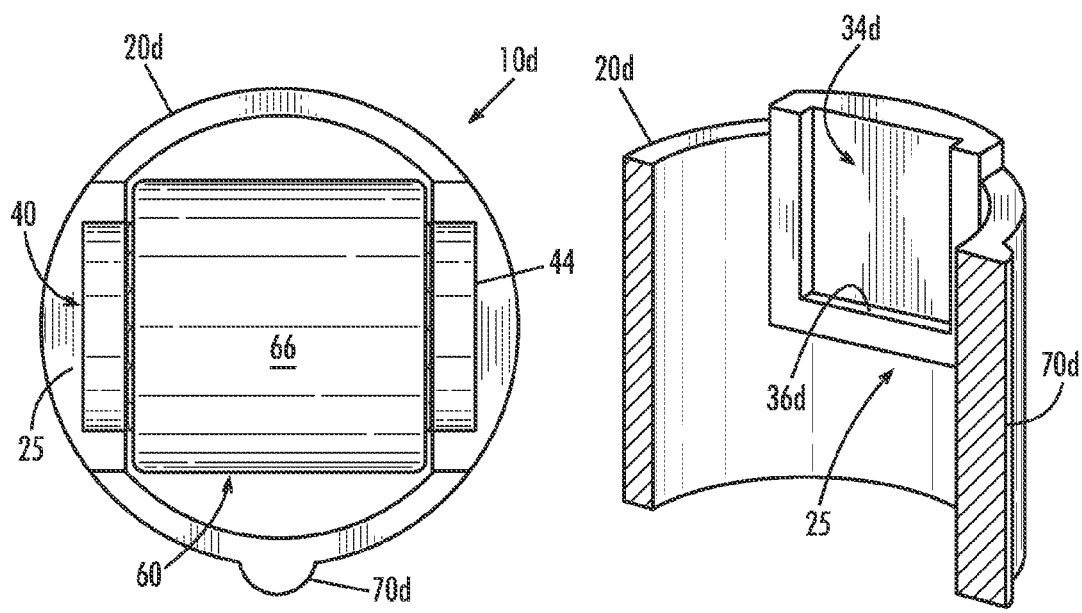
FIG. 12 is a perspective cross-sectional view of the follower mechanism shown in FIGS. 11A and 11B.

Referring now to FIGS. 11A and 11B, an alternate embodiment of a follower mechanism 10d in accordance with the present disclosure is shown. Follower mechanism 10d differs primarily from the embodiment as discussed with regard to FIGS. 10A and 10B in that bucket 20d of follower mechanism 10d includes a pair of yoke supports 25, each of which extends radially inwardly into the interior of bucket 20d. Each yoke support 25 defines an axially extending groove 34d that extends downwardly from a tope edge of bucket 20d and terminates at a corresponding stop face 36d. As such, each axially extending groove 34d extends along only a portion of the height of bucket 20d. Each axially extending groove 34d is configured to slidably receive a corresponding side wall 44 of yoke 40 such that yoke 40 is slidably received within bucket 20d. Similar to the embodiment shown in FIGS. 10A and 10B, bucket 20d is formed with a powdered metal such that the alignment device may be formed as an integral projection 70d of bucket 20d.

Although the preceding embodiments of follower mechanisms have been described for use in an internal combustion engine, they may be used in alternate types of assemblies where it is desirable to translate rotational motion of one component into linear motion of another component. For example, they may be configured for use in a fluid pump to help drive a fluid (e.g., fuel, oil, water, or the like). More specifically, they may be used in camshaft driven high-pressure fuel pumps as used in gasoline direct injection systems.

While one or more preferred embodiments of the invention are described above, it should be appreciated by those skilled in the art that various modifications and variations can be made in the present invention without departing from the scope and spirit thereof. For example, the cross-sectional shapes of the alignment devices and corresponding grooves may be of any shape found to be suitable for the intended purpose. Additionally, the vibration isolator may be constructed of any material found to be suitable for the intended purpose. It is intended that the present invention cover such modifications and variations as come within the scope and spirit of the appended claims and their equivalents.

What is claimed is:

1. A follower mechanism movable within a bore along a longitudinal center axis of the bore, the bore including an alignment groove, comprising:
   a bucket including a cylindrical inner surface and a cylindrical outer surface;
   a yoke positioned at least partially within the bucket, the yoke including a bottom wall and two opposed sidewalls depending upwardly therefrom, each sidewall defining a shaft aperture;
   a shaft having a first end and a second end, the first end and the second end of the shaft each being received in a complimentary one of the shaft apertures of the yoke; and
   a roller follower rotatably received on the shaft such that a portion of the roller follower extends axially outwardly beyond the bucket wherein the cylindrical inner surface of the bucket defines four axially extending and circumferentially spaced apart grooves, the bottom wall of the yoke is substantially rectangular, each of the four axially extending and circumferentially spaced grooves slidably receives a corresponding corner of the bottom wall of the yoke.

2. The follower mechanism of claim 1, wherein the at least one axially extending groove further includes a stop face that is substantially perpendicular to a longitudinal center axis of the follower mechanism.

3. The follower mechanism of claim 1, further comprising an alignment device depending outwardly beyond the cylindrical outer surface of the bucket, the alignment device being slidably received in the alignment groove of the bore.

4. The follower mechanism of claim 3, wherein the alignment device is an integral portion of the bucket.

5. The follower mechanism of claim 4, wherein the bucket is formed of a powdered metal.

6. The follower mechanism of claim 3, wherein the bucket defines an aperture and the alignment device is disposed at least partially within the aperture.

7. The follower mechanism of claim 6, wherein the alignment device is retained in the aperture by a press fit.

8. The follower mechanism of claim 3, wherein the alignment device has a circular cross-sectional shape defined by a plane substantially perpendicular to a longitudinal center axis of the alignment device and a rectangular cross-sectional shape when taken through a plane in which the longitudinal center axis of the alignment device lies.

9. The follower mechanism of claim 3, wherein the alignment device has a rectangular cross-sectional shape defined by a plane substantially perpendicular to a longitudinal center axis of the alignment device and a rectangular cross-sectional shape when taken through a plane in which the longitudinal center axis of the alignment device lies.

10. The follower mechanism of claim 3, wherein the bottom wall of the yoke further comprises a projection extending radially outwardly therefrom, the projection including a distal end that abuts the alignment device.

11. The follower mechanism of claim 1, wherein the roller follower further comprises a cylindrical race and a plurality of roller elements disposed between the shaft and the cylindrical race.

12. The follower mechanism of claim 11, wherein the first and second ends of the shaft are rotatably received within the shaft apertures.

13. A follower mechanism movable within a bore along a longitudinal center axis of the bore, the bore including an alignment groove, comprising:
   a bucket including a cylindrical inner surface, a cylindrical outer surface, and defining an aperture, the aperture having a length parallel to the longitudinal center axis of the bore and a width transverse to the longitudinal center axis of the bore;
   a yoke positioned at least partially within the bucket, the yoke including a bottom wall and two opposed sidewalls depending upwardly therefrom, each sidewall defining a shaft aperture;
   a shaft having a first end and a second end, the first end and the second end of the shaft each being received in a complimentary one of the shaft apertures of the yoke;
   a roller follower rotatably received on the shaft such that a portion of the roller follower extends axially outwardly beyond the bucket; and
   an alignment device positioned at least partially within the aperture, the alignment device having a length parallel to the longitudinal center axis of the bore and a width transverse to the longitudinal center axis of the bore,
   wherein the length of the aperture is greater than the length of the alignment device and the width of the aperture is greater than the width of the alignment device so that the alignment device can pass through the aperture wherein the cylindrical inner surface of the bucket defines four axially extending and circumferentially spaced apart grooves, the bottom wall of the yoke is substantially rectangular, each of the four axially extending and circumferentially spaced grooves slidably receives a corresponding corner of the bottom wall of the yoke.

14. The follower mechanism of claim 13, wherein the alignment device has a circular cross-sectional shape when defined by a plane substantially perpendicular to a longitudinal center axis of the alignment device and a rectangular cross-sectional shape when taken through a plane in which the longitudinal center axis of the alignment device lies.

15. The follower mechanism of claim 13, wherein the alignment device has a rectangular cross-sectional shape defined by a plane substantially perpendicular to a longitudinal center axis of the alignment device and a rectangular cross-sectional shape when taken through a plane in which the longitudinal center axis of the alignment device lies.

* * * * *